Dec. 20, 1966  C. D. ASHCROFT  3,292,793
DISPLAY DEVICE

Filed Feb. 8, 1965  3 Sheets-Sheet 1

CHARLES D. ASHCROFT
INVENTOR.
KENDRICK AND STOLZY
BY
ATTORNEYS

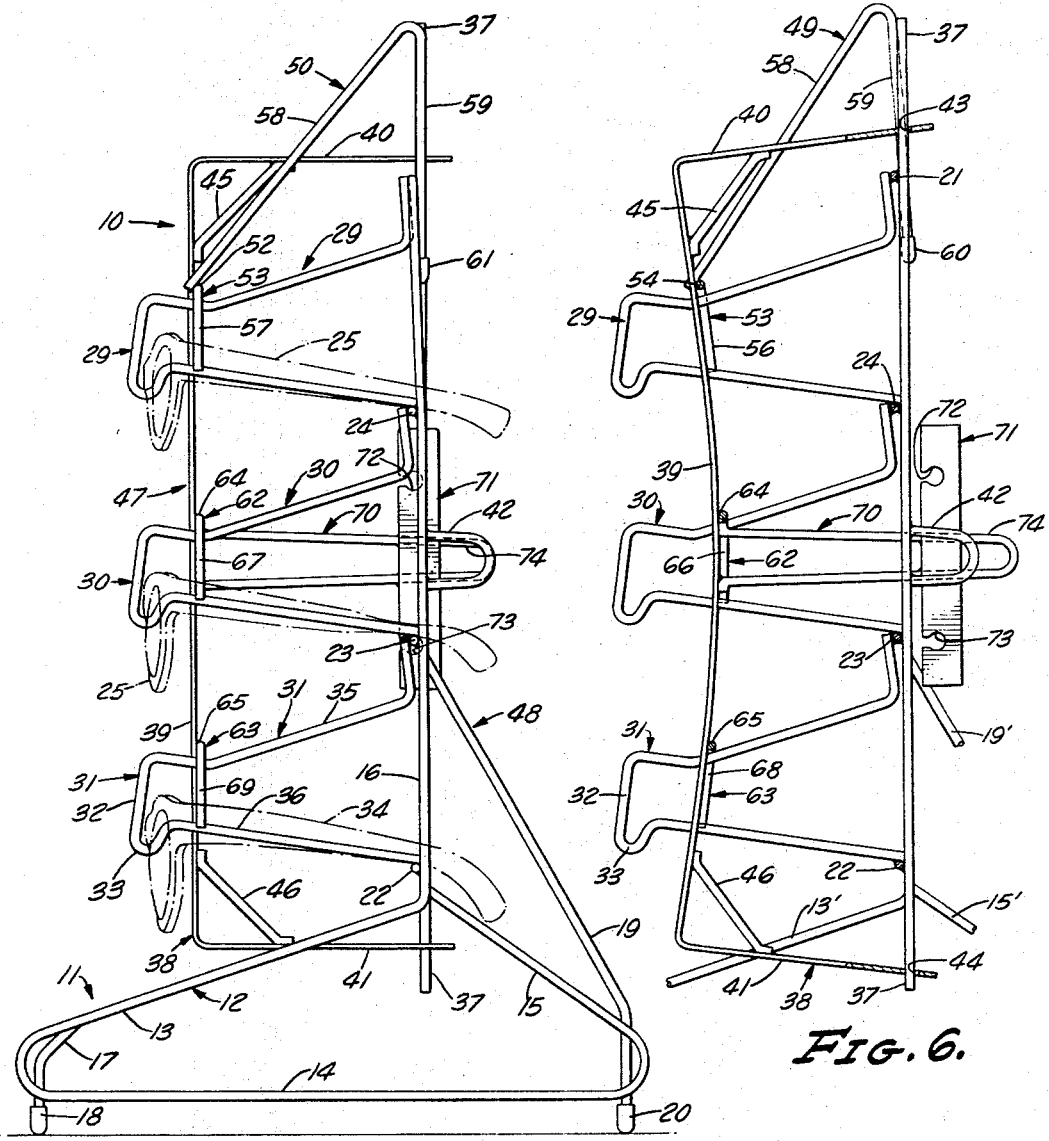

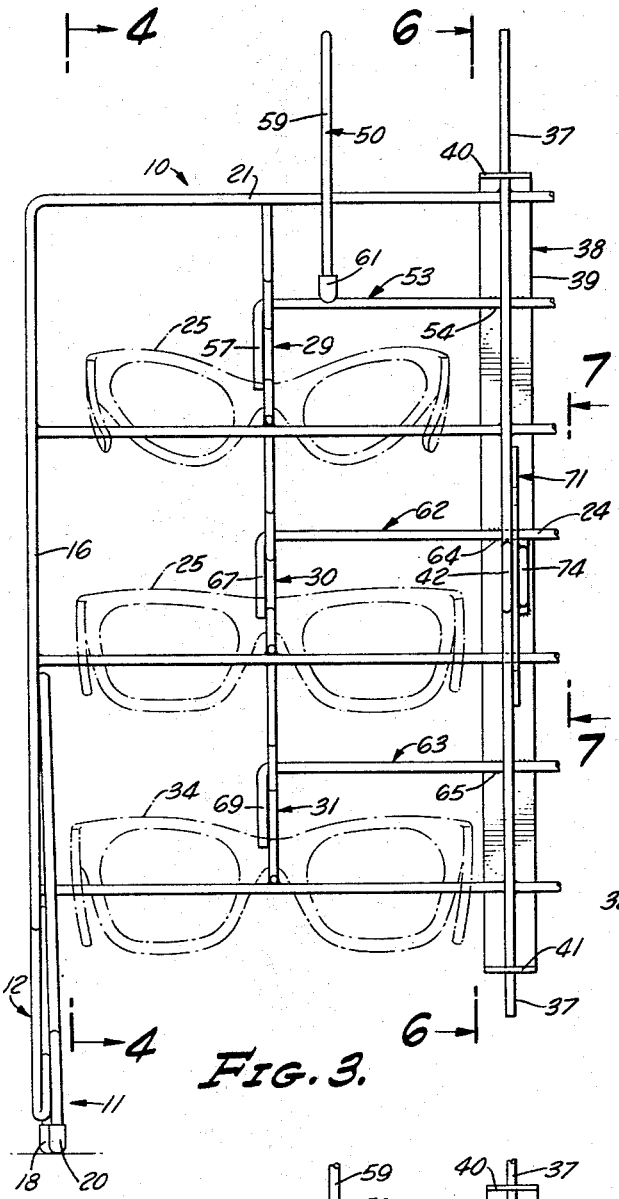

United States Patent Office 3,292,793
Patented Dec. 20, 1966

3,292,793
DISPLAY DEVICE
Charles D. Ashcroft, 1219 Oak Circle Drive,
Glendale, Calif. 91208
Filed Feb. 8, 1965, Ser. No. 431,123
15 Claims. (Cl. 211—4)

This invention relates to apparatus for displaying optical merchandise, and more particularly to a pilfer-proof rack for sunglasses, spectacles, spectacle frames and the like, which rack is useful in selling such items in retail stores and in professional offices.

Although the device of the present invention may have many applications other than those disclosed herein and should not therefore be limited thereto for this reason, the invention has been found to have unusual utility in the marketing of sunglasses.

In the past, sunglasses have often been displayed in showcase enclosures due to the fact that they are frequently stolen when they are displayed on an open shelf or on top of a sales counter. However, keeping sunglasses inside a showcase makes it impossible to sell as much as one-tenth the number of sunglasses that can be sold from open displays on top of the same counter or showcase.

The device of the present invention overcomes the above-described and other disadvantages of the prior art by providing a pilfer-proof spectacle display device. This device includes a first frame which is fixed. A generally U-shaped wire-like member is then fixed to the first frame, the member having a base portion extending approximately vertically and a pair of spaced legs extending approximately horizontally. The member is adapted to carry the nose piece of a pair of spectacles at a position adjacent its base portion. Means are provided which are fixed to the first frame to support the ear pieces of a pair of spectacles in an approximately horizontal position as the nose piece of the same pair of spectacles is carried by the U-shaped member. A second movable frame is also provided. A body is then fixed to the second frame. The second frame is movable from one position with the said body extending between the member legs to prevent a pair of spectacles from being removed from the first frame, to another position to permit removal of spectacles from the first frame.

In accordance with the foregoing, the theft of sunglasses may be prevented. Note will be taken that in general, it will be impossible for some person to steal a whole rack of sunglasses without being noticed.

It is also a feature of the present invention that the display device thereof may be locked and unlocked from the rear thereof.

It is an outstanding feature of the present invention that any number of sunglasses may be locked or unlocked in the display device of the present invention by one simple and short mechanical movement of the second frame. That is, all the sunglasses in the display device may be locked or unlocked simultaneously by a simple manual mechanical movement of the entire frame a distance of an inch or so.

It is also a feature of the present invention that the display device thereof may be constructed of economical wire. In this manner, the display device is made unobstrusive, which it should be. That is, the sunglasses sought to be sold are displayed prominently and in a manner pleasing to the eye.

The above-described and other advantages of the present invention will be better understood from the following description when considered in connection with the accompanying drawings.

In the drawings which are to be regarded as merely illustrative:

FIG. 2 is a side elevational view thereof;

FIG. 3 is a broken rear elevational view of the display device;

FIG. 4 is a vertical sectional view of the display device in its unlocked position taken on the line 4—4 shown in FIG. 3;

FIG. 5 is a broken rear elevational view of a portion of the display device in the open position;

FIG. 6 is a sectional view of the display device in an intermediate position taken on the line 6—6 shown in FIG. 3.

Figure 1:
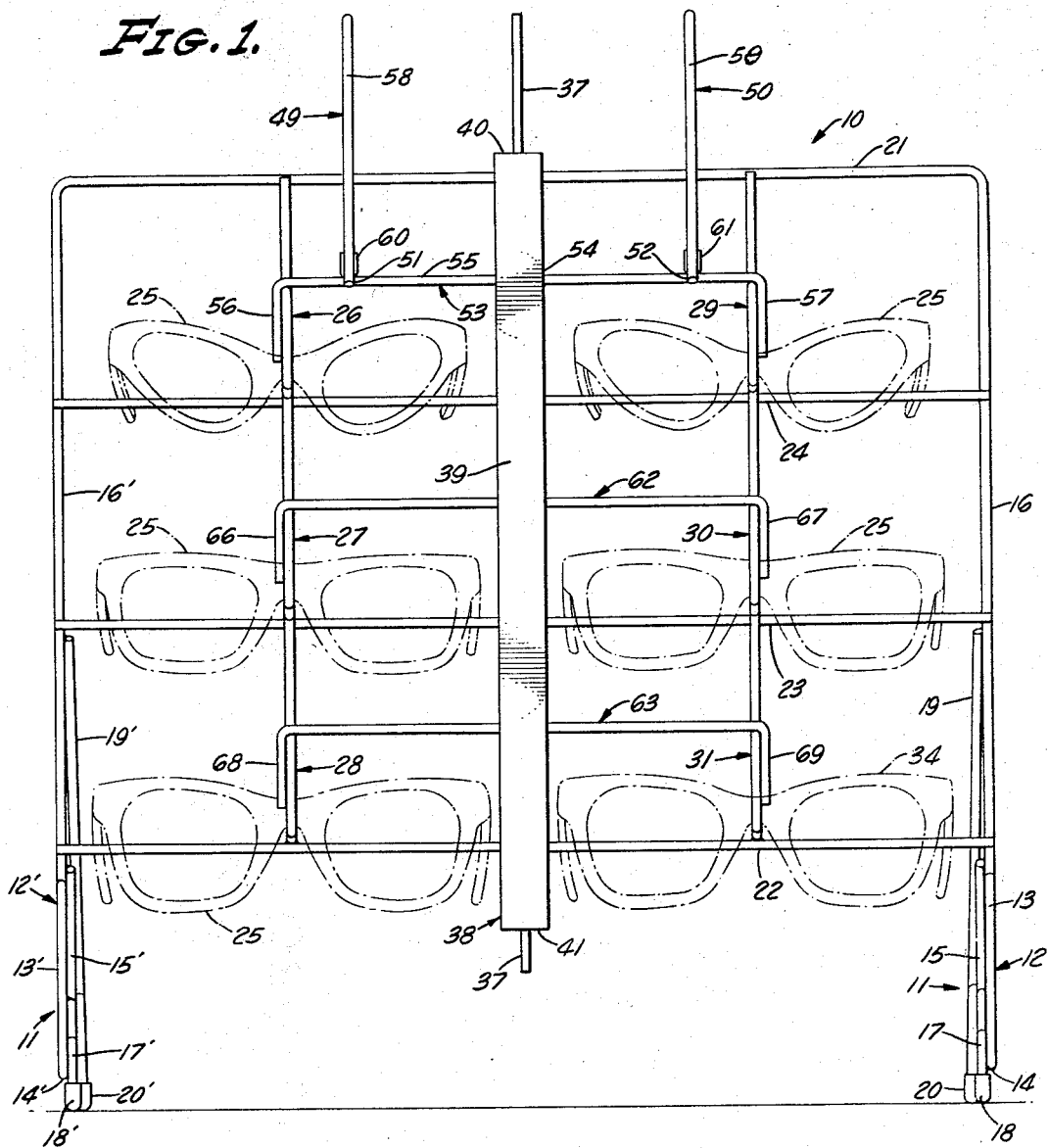
FIG. 1 is a front elevational view of the display device of the present invention.
Figure 7:
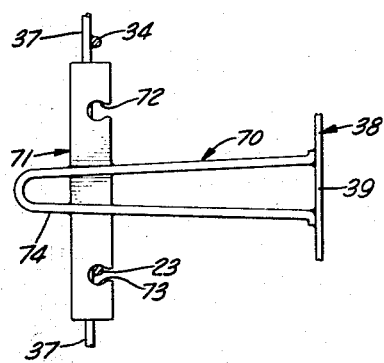
FIG. 7 is a broken side elevational view of a portion of the display device shown in some detail in FIGS. 2, 3, 4 and 6.

In the drawing, in FIGS. 1 and 2, the display device of the present invention is generally indicated at 10. This display device includes a stand 11. Stand 11 includes a loop of wire 12 having portions 13, 14 and 15. Portion 15 terminates behind a vertical post 16 as shown in FIG. 2. The left side of the stand 11 is also provided with similar portions 13', 14' and 15'.

As shown in FIG. 2, a leg 17 is fixed to stand 11, and a conventional plastic tip 18 is positioned on the bottom of leg 17. A second leg is also provided at 19 having a conventional plastic tip 20. Similar legs 17' and 19' with plastic tips 18' and 20' are provided on the left side of the device 10.

A post 16' is also provided on the left-hand side of the device 10 corresponding to post 16. Note will be taken that portion 13 of loop of wire 12 is integral with post 16. The same is true of portion 13' of a loop of wire 12' and post 16'. Note will also be taken that a cross bar is provided at 21 which is integral with posts 16 and 16'. Cross bars at 22, 23 and 24 are fixed to posts 16 and 16'. Spectacle ear pieces rest upon cross bars 22, 23 and 24. Spectacles are indicated in dotted lines at 25.

As shown in FIGS. 1 and 2, six U-shaped members are provided at 26, 27, 28, 29, 30 and 31. All of these members are identical. Hence, only member 31 will be described in detail in FIG. 2. U-shaped member 31 includes a base portion 32 which has an extension 33 to carry the nose piece of a pair of spectacles 34. Member 31 is also provided with legs at 35 and 36 which are fixed to cross bars 22 and 23.

In a similar manner, members 26 and 29 are fixed to cross bars 21 and 24. Members 27 and 30 are fixed to cross bars 23 and 24. Further, member 28 is also fixed to cross bars 22 and 23.

As shown in FIGS. 1, 2 and 3, a guide rod 37 is fixed in a central vertical position to cross bars 21, 22, 23 and 24. A U-shaped wire locking loop at 42 is fixed to guide rod 37.

For clarity, it should be noted at this point that all structure described in detail prior hereto in this specification and given reference numerals is structure fixed relative to stand 11. In general, all structure described hereinafter is structure movable relative to stand 11 and fixed relative to the said second frame referred to previously.

A U-shaped spring metal strip 38 is slideable vertically on guide rod 37. Strip 38 has a vertical base portion 39 and upper and lower horizontal legs 40 and 41. The end of the legs 40 and 41 are provided with holes 43 and 44 through which the upper and lower ends, respectively, of guide rod 37 project. Strip 38 is therefore slidable on guide rod 37.

Strip 38 is provided with a brace at 45 fixed to base 39 and leg 40. Strip 38 is also provided with a brace 46 fixed to base 39 and leg 41.

The said second movable frame is generally indicated at 47 in FIG. 2 and includes strip 38 and all structures fixed relative thereto. The said fixed frame which includes stand 11 is indicated at 48 in FIG. 2 and includes all structures fixed relative to stand 11.

Rotation of movable frame 47 about the axis of guide rod 37 in prevented by a pair of guides 49 and 50 which are fixed at 51 and 52, respectively, to an inverted U-shaped body 53. Body 53 is in turn fixed to strip 38 at 54. Body 53 includes a base portion at 55 which has vertically downwardly extending legs 56 and 57 which span the gap between the legs of members 26 and 29, respectively.

Both guides 49 and 50 are provided with portions 58 and 59, portion 59 extending downwardly behind cross bar 21 and on the right side thereof as viewed in FIG. 2. The lower ends of portions 59 are supplied with conventional plastic tips at 60 and 61, respectively.

Analagous to the structure of body 53, two other inverted U-shaped bodies are provided at 62 and 63 which are fixed at 64 and 65 to strip 38 as shown in FIG. 2. Note will be taken that body 62 has legs 66 and 67 which span the gaps between the legs of members 27 and 30, respectively. Further, body 63 has legs 68 and 69 which span the gaps between the legs of members 28 and 31, respectively.

A loop of wire 70 is fixed to the rear of strip 38. Loop 70 has a plate 71 fixed thereto with notches at 72 and 73 as shown in FIG. 6. Loop 70 also has a portion 74 which extends to the right of plate 71 as shown in FIG. 6. Portion 74 of loop 70 therefore registers with loop 42. The hook of a conventional padlock may then be locked through loops 74 and 42 and all spectacles 25 locked in the positions shown in FIGS. 1 and 2. The padlock may be left open or locked. In either case some measure of shoplifting protection can be obtained.

From the foregoing, it will be appreciated that the device 10 is shown in its locked position in FIGS. 1, 2 and 3. In this case, portion 39 of strip 38, by being spring metal, draws plate 71 to the left as viewed in FIGS. 2 and 6 so that cross bar 23 is located in notch 73 as shown in FIG. 2.

When it is desired that the device 10 should be unlocked, plate 71 is grasped and pulled to the position shown in FIG. 6. Movable frame 47 is then lifted by grasping plate 71 in the position shown in FIG. 6 and lifting plate 71 vertically.

Movable frame 47 is stable in both its lowermost and uppermost limits of travel. In its lowermost limit of travel, cross bar 23 is located in plate notch 73. In its uppermost position, as shown in FIG. 4, cross bar 24 rests in plate notch 72. The manner in which a pair of spectacles may be removed from device 10 with frame 47 in its uppermost position is shown at 25 in FIG. 5.

From the foregoing, it will be appreciated that the legs of members 53, 62 and 63 can all be moved simultaneously from their spectacle locking positions shown in FIG. 2 to spectacle unlocking positions shown in FIG. 4 and vice versa. As stated previously, this is done simply by grasping plate 71 and raising it or lowering it. That is, plate 71 may be pulled out to the position shown in FIG. 6 and lifted vertically to the position shown in FIG. 4. Alternatively, plate 71 may be pulled out from the position shown in FIG. 4 and lowered to the position shown in FIG. 2.

Due to the fact that the device 10 may be so moved all of the spectacles at 25 in FIG. 1 may be locked in the device 10 or unlocked therefrom simultaneously by the single short movement of frame 47.

Further, it will be unlikely that a person can steal the entire device 10 with the spectacles 25 mounted therein as shown in FIG. 1 without the theft being detected. In this regard, it will be noted that rather than two columns of three spectacles 25, fewer or greater columns may be employed. More or less than three spectacles 25 in a single column may also be employed, the device 10 thereby assuming an appropriate size.

Still a further feature of the invention will be noted in that the wire framework of device 10 is of an economical construction. This construction also makes the device 10 unobstrusive and facilitates the creation of a display of spectacles 25 pleasing in appearance, the spectacles 25 being displayed prominently and clearly in view as shown in FIGS. 1 and 2.

Although only one specific embodiment of the invention has been described and illustrated, many changes and modifications thereof will, of course, suggest themselves to those skilled in the art. The invention should therefore not be limited to the single embodiment selected for this disclosure, the true scope of the invention being defined only in the appended claims.

What is claimed:

1. A spectacle display device, said device comprising: a frame; upper and lower wire-like portions fixed to said frame; stop means to prevent a pair of spectacles from traveling beyond the ends of said portions, said lower portion being inclined downwardly away from said stop means, said lower portion at the position of said stop means having a downwardly extending loop to carry the nose piece of a pair of spectacles; and means to support the ear pieces of a pair of spectacles in a position inclined downwardly away from said stop means in the direction of said lower wire-like portion.

2. A spectacle display device, said device comprising: a frame; a wire-like member fixed to said frame in an approximately horizontal position, said member having a loop therein to carry the nose piece of a pair of spectacles; and means fixed to said frame to support the ear pieces of a pair of spectacles in an approximately horizontal position while the nose piece thereof is carried by said member loop.

3. A pilfer proof spectacle display device, said device comprising: a first frame; a generally U-shaped wire-like member fixed to said frame, said member having a base portion extending approximately vertically and a pair of spaced legs extending approximately horizontally, said member being adapted to carry the nose piece of a pair of spectacles at a position adjacent the base portion thereof; means fixed to said frame to support the ear pieces of a pair of spectacles in an approximately horizontal position as the nose piece thereof is carried by said U-shaped member; a second frame, said second frame being slidably mounted on said first frame; and a body fixed to said second frame, said body being movable rearwardly and upwardly in relation to said first frame, said body having legs which are adjacent the front of said U-shaped member, said second frame being movable from one position with said body extending between said member legs to prevent a pair of spectacles from being removed from said first frame, to another position to permit removal of spectacles from said first frame.

4. A pilfer proof spectacle display device, said device comprising: a first frame; a plurality of generally U-shaped wire-like members fixed to said first frame, said members having base portions extending approximately vertically and pairs of spaced legs extending approximately horizontally, each of said members being adapted to carry the nose piece of a pair of spectacles at a position adjacent the base portion of each; means fixed to said first frame to support the ear pieces of spectacles in an approximately horizontal position as the nose piece thereof is carried by the member corresponding thereto; a second frame, said second frame being slidably mounted on said first frame; and a plurality of bodies fixed to said second frame, each of said bodies being movable rearwardly and upwardly in relation to said first frame, each of said bodies having legs which are adjacent the front of said U-shaped member, said second frame being movable from one position with one of said bodies extending between the said legs of a corresponding member to prevent spectacles from being removed from said first frame, to another position to permit removal of spectacles from said first frame.

5. A pilfer proof spectacle display device, said device comprising: a first frame; a generally U-shaped wire-like member fixed to said frame said member having a base portion extending approximately vertically and a pair of spaced legs extending approximately horizontally, said member being adapted to carry the nose piece of a pair of spectacles at a position adjacent the base portion thereof; means fixed to said frame to support the ear pieces of a pair of spectacles in an approximately horizontal position as the nose piece thereof is carried by said U-shaped member; a second frame, said second frame being slidably mounted on said first frame; a body fixed to said second frame, said body being movable rearwardly and upwardly in relation to said first frame, said body having legs which are adjacent the front of said U-shaped member, said second frame being movable from one position with said body extending between said member legs to prevent a pair of spectacles from being removed from said first frame to another position to permit removal of spectacles from said first frame; and means to lock said second frame in either one of said two positions thereof.

6. A pilfer proof spectacle display device, said device comprising: a first frame; a plurality of generally U-shaped wire-like members fixed to said first frame said members having base portions extending approximately vertically and pairs of spaced legs extending approximately horizontally, each of said members being adapted to carry the nose piece of a pair of spectacles at a position adjacent the base portion of each; means fixed to said first frame to support the ear pieces of spectacles in an approximately horizontal position as the nose piece thereof is carried by the member corresponding thereto; a second frame, said second frame being slidably mounted on said first frame; a plurality of bodies fixed to said second frame, each of said bodies being movable rearwardly and upwardly in relation to said first frame, each of said bodies having legs which are adjacent the front of said U-shaped member, said second frame being movable from one position with one of said bodies extending between the said legs of a corresponding member to prevent spectacles from being removed from said first frame, to another position to permit removal of spectacles from said first frame; and means to lock said second frame in either one of said two positions thereof.

7. A spectacle display device, said device comprising: a stand; a pair of wire posts fixed to said stand in a vertical position; a plurality of cross rods fixed to said posts; a plurality of generally U-shaped wire-like members fixed to said cross rods, said members each having a base portion extending approximately vertically and a pair of spaced legs extending approximately horizontally, the ends of said legs being fixed to said cross rods, the base portion and legs of each of said members lying in a single plane perpendicular to said cross rods and extending in a predetermined direction therefrom; upper and lower rod projections above and below the uppermost and lowermost cross rods; a U-shaped spring metal strip having a vertical base portion and legs with holes therein surrounding said upper and lower rod projections, respectively; a plurality of wires fixed to said strip, said wires having legs movable vertically with said strip from positions allowing spectacles to be inserted between the legs of said U-shaped members to locking positions spanning the gaps between said member legs adjacent said base portions thereof to prevent spectacles from being removed from between said member legs; a guide fixed to each side of the top one of said wires and bent to a position contiguous to the rearward side of the upper one of said cross rods; a first loop of wire fixed to said strip intermediate the legs thereof, said first loop of wire extending rearwardly of said cross rods; a second loop of wire fixed to said cross rods in a position in registry with said first loop of wire when said member legs are in their locking positions; and a plate fixed to said first loop, said plate being notched to receive a cross bar to hold said members in either one of said two positions thereof.

8. A pilfer proof device for displaying an eyeglass frame with or without lenses but having a pair of eye pieces and a nose piece smaller than the eye pieces connecting the eye pieces together, said device comprising: a first framework; a generally U-shaped wire-like member fixed to said first framework, said member having a base portion extending approximately vertically and a pair of spaced legs extending approximately horizontally, one above the other, said member being adapted to carry the nose piece of said eyeglass frame; a second framework; and a body fixed to said second framework, one of said frameworks being movable relative to the other from one position to another, said body extending between said member legs when said one framework is in said one position, said body defining a closed loop with said member legs and said member base portion when said one framework is in said one position, said closed loop being of a size sufficiently large to encompass a nose piece, the maximum transverse dimension across said closed loop being of a magnitude sufficiently small to prevent either eye piece from passing through said loop when said one framework is in said one position, said body being in a position opening said loop to permit an eyeglass frame to be removed from said U-shaped member when said one framework is in said other position.

9. A pilfer proof device for displaying an eyeglass frame with or without lenses but having a pair of eye pieces and a nose piece smaller than the eye pieces connecting the eye pieces together said device comprising: a first framework; a generally U-shaped wire-like member fixed to said first framework, said member having a base portion extending approximately vertically and a pair of spaced legs extending approximately horizontally, one above the other, said member being adapted to carry the nose piece of said eyeglass frame; a second framework; a body fixed to said second framework, one of said frameworks being movable relative to the other from one position to another, said body extending between said member legs when said one framework is in said one position, said body defining a closed loop with said member legs and said member base portion when said one framework is in said one position, said closed loop being of a size sufficiently large to encompass a nose piece, the maximum transverse dimension across said closed loop being of a magnitude sufficiently small to prevent either eye piece from passing through said loop when said one framework is in said one position, said body being in a position opening said loop to permit an eyeglass frame to be removed from said U-shaped member when said one framework is in said other position; and additional means fixed relative to said first framework to hold an eyeglass frame on said U-shaped member in a position such that eye pieces are disposed at the same height on opposite sides of said U-shaped member in an approximately vertical plane perpendicular to that of said U-shaped member.

10. A pilfer proof device for displaying an eyeglass frame with or without lenses but having a pair of eye pieces and a nose piece smaller than the eye pieces connecting the eye pieces together, said device comprising: a first framework; a generally U-shaped wire-like member fixed to said first framework, said member having a base portion extending approximately vertically and a pair of spaced legs extending approximately horizontally, one above the other, said member being adapted to carry the nose piece of said eyeglass frame; a second framework; a body fixed to said second framework; one of said frameworks being movable relative to the other from one position to another, said body extending between said member legs when said one framework is in said one position, said body defining a closed loop with said member legs and said member base portion when said one framework is in said one position, said closed loop being of a size sufficiently large to encompass a nose piece, the maximum transverse dimension across said closed loop being of a magnitude sufficiently small to prevent either eye piece from passing through said loop when said one framework is in said one position, said body being in a position opening said loop to permit an eyeglass frame to be removed from said U-shaped member when said one framework is in said other position; and means to lock said one framework in at least said one position.

11. A pilfer proof device for displaying an eyeglass frame with or without lenses but having a pair of eye pieces and a nose piece smaller than the eye pieces connecting the eye pieces together, said device comprising: a first framework; a generally U-shaped wire-like member fixed to said first framework, said member having a base portion extending approximately vertically and a pair of spaced legs extending approximately horizontally, one above the other, said member being adapted to carry the nose piece of said eyeglass frame; a second framework; a body fixed to said second framework; one of said frameworks being movable relative to the other from one position to another, said body extending between said member legs when said one framework is in said one position, said body defining a closed loop with said member legs and said member base portion when said one framework is in said one position, said closed loop being of a size sufficiently large to encompass a nose piece, the maximum transverse dimension across said closed loop being of a magnitude sufficiently small to prevent either eye piece from passing through said loop when said one framework is in said one position, said body being in a position opening said loop to permit an eyeglass frame to be removed from said U-shaped member when said one framework is in said other position; means to lock said one framework in at least one position; and additional means fixed relative to said first framework to hold an eyeglass frame on said U-shaped member in a position such that eye pieces are disposed at the same height on opposite sides of said U-shaped member in an approximately vertical plane perpendicular to that of said U-shaped member.

12. A pilfer proof device for displaying a plurality of eyeglass frames with or without lenses, each frame having a pair of eye pieces and a nose piece smaller than the eye pieces thereof connecting the eye pieces together, said device comprising: a first framework; a plurality of generally U-shaped wire-like members fixed to said first framework, each member having a base portion extending approximately vertically and a pair of spaced legs extending approximately horizontally, one above the other, each member being adapted to carry the nose piece of an eyeglass frame; a second framework; and a plurality of bodies fixed to said second framework, one of said frameworks being movable relative to the other from one position to another, each body extending between the legs of only one corresponding U-shaped member when said one framework is in said one position, each body defining a closed loop with the legs and base portion of a corresponding U-shaped member, each closed loop being of a size sufficiently large to encompass the nose piece of an eyeglass frame, the maximum transverse dimension across each closed loop being of a magnitude sufficiently small to prevent either eye piece of an eyeglass frame from passing through each loop when said one framework is in said one position, each body being in a position opening each corresponding loop to permit an eyeglass frame to be removed from each corresponding U-shaped member when said one framework is in said other position.

13. A pilfer proof device for displaying a plurality of eyeglass frames with or without lenses, each frame having a pair of eye pieces and a nose piece smaller than the eye pieces thereof connecting the eye pieces together, said device comprising: a first framework; a plurality of generally U-shaped wire-like members fixed to said first framework, each member having a base portion extending approximately vertically and a pair of spaced legs extending approximately horizontally, one above the other, each member being adapted to carry the nose piece of an eyeglass frame; a second framework; a plurality of bodies fixed to said second framework, one of said frameworks being movable relative to the other from one position to another, each body extending between the legs of only one corresponding U-shaped member when said one framework is in said one position, each body defining a closed loop with the legs and base portion of a correspond U-shaped member, each closed loop being of a size sufficiently large to encompass the nose piece of an eyeglass frame, the maximum transverse dimension across each closed loop being of a magnitude sufficiently small to prevent either eye piece of an eyeglass frame from passing through each loop when said one framework is in said one position, each body being in a position opening each corresponding loop to permit an eyeglass frame to be removed from each corresponding U-shaped member when said one framework is in said other position; and additional means fixed to said first framework to hold eyeglass frames on said U-shaped members in positions such that the eye pieces of each frame are disposed at the same height on opposite sides of a corresponding U-shaped member in an approximately vertical plane perpendicular to that of the said corresponding U-shaped member.

14. A pilfer proof device for displaying a plurality of eyeglass frames with or without lenses, each frame having a pair of eye pieces and a nose piece smaller than the eye pieces thereof connecting the eye pieces together, said device comprising: a first framework; a plurality of generally U-shaped wire-like members fixed to said first framework, each member having a base portion extending approximately vertically and a pair of spaced legs extending approximately horizontally one above the other, each member being adapted to carry the nose piece of an eyeglass frame; a second framework; a plurality of bodies fixed to said second framework, one of said frameworks being movable relative to the other from one position to another, each body extending between the legs of only one corresponding U-shaped member when said one framework is in said one position, each body defining a closed loop with the legs and base portion of a corresponding U-shaped member, each closed loop being of a size sufficiently large to encompass the nose piece of an eyeglass frame, the maximum transverse dimension across each closed loop being of a magnitude sufficiently small to prevent either eye piece of an eyeglass frame from passing through each loop when said one framework is in said one position, each body being in a position opening each corresponding loop to permit an eyeglass frame to be removed from each corresponding U-shaped member when said one framework is in said other position; and means to lock said one framework in at least said one position.

15. A pilfer proof device for displacing a plurality of eyeglass frames with or without lenses, each frame having a pair of eye pieces and a nose piece smaller than the eye pieces thereof connecting the eye pieces together, said device comprising: a first framework; a plurality of generally U-shaped wire-like members fixed to said first framework, each member having a base portion extending approximately vertically and a pair of spaced legs extending approximately horizontally, one above the other, each member being adapted to carry the nose piece of an eyeglass frame; a second framework; a plurality of bodies fixed to said second framework, one of said frameworks being movable relative to the other from one position to another, each body extending between the legs of only one corresponding U-shaped member when said one framework is in said one position, each body defining a closed loop with the legs and base portion of a corresponding U-shaped member, each closed loop being of a size sufficiently large to encompass the nose piece of an eyeglass frame, the maximum transverse dimension across each closed loop being of a magnitude sufficiently small to prevent either eye piece of an eyeglass frame from passing through each loop when said one framework is in said one position, each body being in a position opening each corresponding loop to permit an eyeglass frame to be removed from each corresponding U-shaped member when said one framework is in said other position; means to lock said one framework in at least said one position; and additional means fixed relative to said first framework to hold an eyeglass frame on said U-shaped member in a position such that eye pieces are disposed at the same height on opposite sides of said U-shaped member in an approximately vertical plane perpendicular to that of said U-shaped member.

References Cited by the Examiner

UNITED STATES PATENTS

| | | | |
|---|---|---|---|
| 2,905,328 | 9/1959 | Munao et al. | 211—13 |
| 2,926,788 | 3/1960 | Jacobson | 211—4 |
| 3,128,022 | 4/1964 | Mastrud | 224—45 |
| 3,195,731 | 7/1965 | Bomar | 211—13 |

CLAUDE A. LE ROY, *Primary Examiner.*

W. D. LOULAN, *Assistant Examiner.*